(12) United States Patent
Angelo et al.

(10) Patent No.: US 6,581,162 B1
(45) Date of Patent: *Jun. 17, 2003

(54) METHOD FOR SECURELY CREATING, STORING AND USING ENCRYPTION KEYS IN A COMPUTER SYSTEM

(75) Inventors: Michael F. Angelo, Houston, TX (US); Peter J. Michels, Plano, TX (US)

(73) Assignee: Compaq Information Technologies Group, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,615

(22) Filed: Dec. 31, 1996

(51) Int. Cl.[7] .............................. H04K 9/00; G06F 12/14
(52) U.S. Cl. ........................................ 713/193; 380/277
(58) Field of Search .............................. 380/25, 44, 50, 380/4, 3; 395/186, 187, 188.01

(56) References Cited

U.S. PATENT DOCUMENTS

| | | | | |
|---|---|---|---|---|
| 4,405,829 A | | 9/1983 | Rivest et al. ............... 178/22.1 |
| 4,799,258 A | | 1/1989 | Davies .......................... 380/21 |
| 4,885,789 A | * | 12/1989 | Burger et al. ................. 380/25 |
| 4,890,323 A | | 12/1989 | Beker et al. .................. 380/25 |
| 5,276,737 A | | 1/1994 | Micali .......................... 380/30 |
| 5,311,595 A | * | 5/1994 | Bjerrum et al. ............... 380/25 |
| 5,315,658 A | | 5/1994 | Micali .......................... 380/30 |
| 5,341,425 A | * | 8/1994 | Wasilewski et al. .......... 380/20 |
| 5,359,660 A | | 10/1994 | Clark et al. ................... 380/25 |
| 5,375,243 A | | 12/1994 | Parzych et al. .............. 395/725 |
| 5,406,624 A | * | 4/1995 | Tulpan ........................... 380/4 |
| 5,432,849 A | * | 7/1995 | Johnson et al. ............... 380/21 |
| 5,479,514 A | * | 12/1995 | Klonowski .................... 380/47 |
| 5,511,122 A | | 4/1996 | Atkinson ...................... 380/25 |
| 5,537,540 A | | 7/1996 | Miller et al. .............. 395/183.14 |
| 5,537,544 A | | 7/1996 | Morisawa et al. ...... 395/180.01 |
| 5,590,199 A | | 12/1996 | Krajewski et al. ............. 380/25 |
| 5,630,057 A | * | 5/1997 | Hait ............................ 395/186 |
| 5,710,817 A | * | 1/1998 | Sjooquist .................... 380/25 |
| 5,724,027 A | * | 3/1998 | Shipman et al. ......... 340/825.31 |
| 5,748,888 A | * | 5/1998 | Angelo et al. .............. 395/186 |
| 5,822,434 A | * | 10/1998 | Caronni et al. ............... 380/49 |
| 5,963,142 A | | 10/1999 | Zinsky et al. |
| 5,970,143 A | * | 10/1999 | Schneier et al. ............... 380/23 |
| 6,005,945 A | * | 12/1999 | Whitehouse ................. 380/51 |

OTHER PUBLICATIONS

Schneier, Bruce, Applied Cryptography, 1996, pp. 32–33.*
Applied Cryptography, Second Edition, pp. 47–74; 97–100; 169–187, 1996.
Intel486™ SL Microprocessor SuperSet System Design Guide, pp. 12–14 through 12–29, Nov. 1992.
Intel486™ SL Microprocessor SuperSet Programmer's Reference Manual, pp. 6–28 through 6–53, Nov. 1992.

* cited by examiner

*Primary Examiner*—Gilberto Barron
*Assistant Examiner*—Douglas J Meislahn
(74) *Attorney, Agent, or Firm*—Akin, Gump, Strauss, Hauer & Feld, LLP

(57) ABSTRACT

A secure environment for entering and storing information necessary to conduct encryption processes. In a computer system according to the invention, session keys, passwords, and encryption algorithms are maintained in a secure memory space such as System Management Mode (SMM) memory. In one disclosed embodiment of the invention, a user password is entered via a secure keyboard channel. The password is maintained in a secure memory space that is not accessible during normal computer operation. In addition to the user password, optional node identification information is stored in secure memory. The node identification information is appended to the user password, and both are subsequently encrypted by an encryption algorithm and encryption keys that are also stored in secure memory. Following the encryption process, the encrypted password and node identification information are communicated directly from secure memory to network interface circuitry for communication over a network. In another disclosed embodiment of the invention, data entered in a secure manner is utilized as an encryption key (or to generate an encryption key) for securely encrypting packets of data prior to communicating the data over a computer network. The encryption key data entered by the user is securely stored for use in multiple encryption processes during a communication session, thereby alleviating the overhead of repeated key renegotiation that is typically required. In addition, an encryption key that is no longer needed can be safely destroyed in secure memory without the danger of unidentified copies of the key remaining in computer memory.

16 Claims, 5 Drawing Sheets

METHOD FOR SECURELY CREATING, STORING AND USING ENCRYPTION KEYS IN A COMPUTER SYSTEM

BACKGROUND OF THE INVENTION

1. Field of the Invention

The invention relates to security in a computer system, and more particularly to a secure method for creating, storing, and using encryption keys in a distributed computing environment.

2. Description of the Related Art

One known approach to computer security involves encryption or cryptography. Cryptography is typically used to protect both data and communications. Generally, an original message or data item is referred to as "plain text", while "encryption" denotes the process of disguising or altering a message in such a way that its substance is not readily discernable. An encrypted message is called "ciphertext". Ciphertext is returned to plain text by an inverse operation referred to as "decryption". Encryption is typically accomplished through the use of a cryptographic algorithm, which is essentially a mathematical function. The most common cryptographic algorithms are key-based, where special knowledge of variable information called a "key" is required to decrypt ciphertext. There are many types of key-based cryptographic algorithms, providing varying levels of security.

The most common cryptographic algorithms are key-based, where special knowledge of variable information called a "key" is required to decrypt ciphertext. There are two prevalent types of key-based algorithms: "symmetric" (also called secret key or single key algorithms) and "public key" (also called asymmetric algorithms). The security in these algorithms is centered around the keys—not the details of the algorithm itself. This makes it possible to publish the algorithm for public scrutiny and then mass produce it for incorporation into security products.

In most symmetric algorithms, the encryption key and the decryption key are the same. This single key encryption arrangement is not flaw-free. The sender and recipient of a message must somehow exchange information regarding the secret key. Each side must trust the other not to disclose the key. Further, the sender must generally communicate the key via another media (similar to a bank sending the personal identification number for an ATM card through the mail). This arrangement is not practical when, for example, the parties interact electronically for the first time over a network. The number of keys also increases rapidly as the number of users increases.

With public key algorithms, by comparison, the key used for encryption is different from the key used for decryption. It is generally very difficult to calculate the decryption key from an encryption key. In typical operation, the "public key" used for encryption is made public via a readily accessible directory, while the corresponding "private key" used for decryption is known only to the recipient of the ciphertext. In an exemplary public key transaction, a sender retrieves the recipient's public key and uses it to encrypt the message prior to sending it. The recipient then decrypts the message with the corresponding private key. It is also possible to encrypt a message using a private key and decrypt it using a public key. This is sometimes used in digital signatures to authenticate the source of a message.

The number of cryptographic algorithms is constantly growing. The two most popular are DES (D)ata Encryption Standard) and RSA (named after its inventors—Rivest, Shamir, and Adleman). DES is a symmetric algorithm with a fixed key length of 56 bits. RSA is a public key algorithm that can be used for both encryption and digital signatures. DSA (Digital Signature Algorithm) is another popular public key algorithm that is only used for digital signatures. With any of these algorithms, the relative difficulty of breaking an encrypted message by guessing a key with a brute force attack is proportional to the length of the key. For example, if the key is 40 bits long, the total number of possible keys ($2^{40}$) is about 110 billion. Given the computational power of modern computers, this value is often considered inadequate. By comparison, a key length of 56 bits provides 65,636 times as many possible values as the 40 bit key.

One problem with public key algorithms is speed. Public key algorithms are typically on the order of 1,000 times slower than symmetric algorithms. For this reason, secure communications are often implemented using a hybrid cryptosystem. In such a system, one party encrypts a random "session key" with the other party's public key. The receiving party recovers the session key by decrypting it with his/her private key. All further communications are encrypted using the same session key (which effectively is a secret key and can take the form of a user password) with a symmetric algorithm.

Session keys may be used for a number of limited purposes, including encryption and decryption, or for authorized access to specific machines at specified times. One scheme to handle such restrictions involves attaching a control vector (CV) to a session key. The CV delineates the permitted uses and restrictions of the session key. This CV is first hashed and exclusive or'ed (XORed) with a master key. The result is used as an encryption key to encrypt the session key. The resultant encrypted session key and the CV are then stored in accessible memory. The session key can be recovered by hashing the CV and XORing it with the master key. The result is then used to decrypt the encrypted session key.

One vulnerability this approach shares with most other data encryption processes lies in the fact that keys or passwords are communicated from secure memory to exposed memory. Further, repeated data packet encryption processes are also carried out in exposed memory. "Sniffing" by surreptitious programs or viruses having the ability to monitor and intercept processes running in normal memory can severely undermine security measures. Intercepted passwords and keys could be saved or secretly transmitted to be used later for unauthorized purposes. This type of security breach is likely to become increasingly recurrent in the future and has not been adequately addressed by computer manufacturers.

A further problem arising from the use of cryptographic algorithms involves the destruction of cryptographic keys. The longer a key is used, the greater the chance that it will be compromised and the greater the resulting loss. Keys are therefore often used for short periods only before being destroyed. During use, however, keys are often copied and stored in multiple locations in computer memory. The problem is exacerbated by computers that perform their own memory management in which programs are swapped in and out of memory. As a result, it is often difficult to ensure that complete key erasure has taken place, particularly when the computer's operating system controls the erasure process.

SUMMARY OF THE INVENTION

Briefly, a computer system according to the invention provides a secure environment for entering and storing information necessary to conduct encryption processes. Session keys, passwords, and encryption algorithms are maintained in a secure memory space such as System Management Mode (SMM) memory.

In one embodiment of the invention, user password or personal identification number (PIN) information is entered via a secure keyboard channel or during a secure mode of operation such as a protected power-up procedure. The information is maintained in a secure memory space that is not accessible during normal computer operation. In addition to the user password or PIN information, optional node identification information is stored in secure memory. The node identification information is appended to the user password or PIN information, and both are subsequently encrypted by an encryption algorithm and encryption keys that are also stored in secure memory. The node identification information allows a network server or other networked resource to identify the particular computer system with which it is communicating and grant access privileges accordingly. Following the encryption process, the encrypted password and node identification information is communicated directly from secure memory to network interface circuitry for communication over a network.

In another disclosed embodiment of the invention, data entered in a secure manner is utilized as an encryption key (or to generate an encryption key). In secure memory, the encryption key governs the encryption of packets of data prior to communicating the data over a computer network. The encryption key data entered by the user is securely stored for use in multiple encryption processes during a communication session, thereby alleviating the overhead of repeated key renegotiation that is typically required.

Further, by maintaining the passwords, encryption keys and algorithms in secure memory, the encryption process can be protected from exposure to malicious software programs or viruses written to circumvent security measures. In addition, an encryption key that is no longer needed can be safely destroyed in secure memory without the danger of unaccounted for copies of the key remaining in computer memory.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following patents and applications are hereby incorporated by reference:

Commonly-assigned U.S. Pat. No. 5,537,540, entitled "TRANSPARENT, SECURE COMPUTER VIRUS DETECTION METHOD AND APPARATUS", referred to as the "SAFESTART patent";

Commonly-assigned U.S. patent application Ser. No. 08/396,343, entitled, "SECURITY CONTROL FOR A PERSONAL COMPUTER," filed on Mar. 3, 1995;

Commonly-assigned U.S. patent application Ser. No. 08/657,982, entitled "METHOD AND APPARATUS FOR PROVIDING SECURE AND PRIVATE KEYBOARD COMMUNICATIONS IN COMPUTER SYSTEMS", filed on May 29, 1996.

Commonly-assigned U.S. patent application Ser. No. 08/766,267 entitled "SECURELY GENERATING A COMPUTER SYSTEM PASSWORD BY UTILIZING AN EXTERNAL ENCRYPTION ALGORITHM", filed on Dec. 13, 1996.

Figure 1:
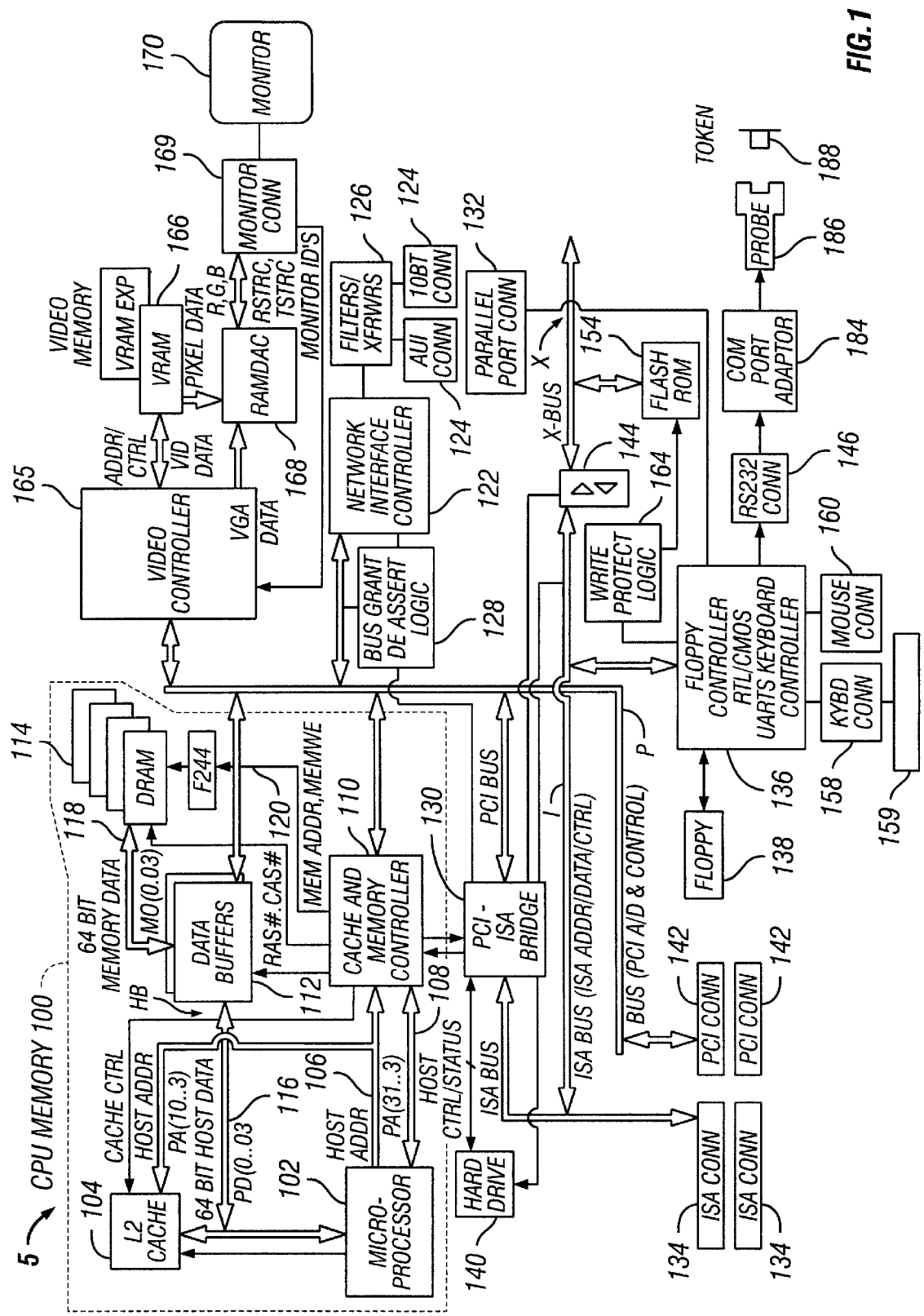
FIG. 1 is a schematic block diagram of a computer system incorporating capabilities for securely managing encryption keys according to the invention.

Referring first to FIG. 1, a computer system S according to the present invention is shown. In the preferred embodiment, the system S incorporates two primary buses: a Peripheral Component Interconnect (PCI) bus P which includes an address/data portion and a control signal portion; and an Industry Standard Architecture (ISA) bus I which includes an address portion, a data portion, and a control signal portion. The PCI and ISA buses P and I form the architectural backbone of the computer system S.

A CPU/memory subsystem 100 is connected to the PCI bus P. The processor 102 is preferably the Pentium® processor from Intel Corporation, but could be an 80486 or any number of similar or next-generation processors. The processor 102 drives data, address, and control portions 116, 106, and 108 of a host bus HB. A level 2 (L2) or external cache memory 104 is connected to the host bus HB to provide additional caching capabilities that improve the overall performance of the computer system S. The L2 cache 104 may be permanently installed or may be removable if desired. A cache and memory controller 110 and a PCI-ISA bridge chip 130 are connected to the control and address portions 108 and 106 of the host bus HB. The cache and memory controller chip 110 is configured to control a series of data buffers 112. The data buffers 112 are preferably the 82433LX from Intel, and are coupled to and drive the host data bus 116 and a MD or memory data bus 118 that is connected to a memory array 114. A memory address and memory control signal bus 120 is provided from the cache and memory controller 110.

The data buffers 112, cache and memory controller 110, and PCI-ISA bridge 130 are all connected to the PCI bus P. The PCI-ISA bridge 130 is used to convert signals between the PCI bus P and the ISA bus I. The PCI-ISA bridge 130 includes: the necessary address and data buffers, arbitration and bus master control logic for the PCI bus P, ISA arbitration circuitry, an ISA bus controller as conventionally used in ISA systems, an IDE (intelligent drive electronics) interface, and a DMA controller. A hard disk drive 140 is connected to the IDE interface of the PCI-ISA bridge 130. Tape drives, CD-ROM devices or other peripheral storage devices (not shown) can be similarly connected.

In the disclosed embodiment, the PCI-ISA bridge 130 also includes miscellaneous system logic. This miscellaneous system logic contains counters and activity timers as conventionally present in personal computer systems, an interrupt controller for both the PCI and ISA buses P and I, and power management logic. Additionally, the miscellaneous system logic may include circuitry for a security management system used for password verification and to allow access to protected resources.

The PCI-ISA bridge 130 also includes circuitry to generate a "soft" SMI (System Management Interrupt), as well as SMI and keyboard controller interface circuitry. The miscellaneous system logic is connected to the flash ROM 154 through write protection logic 164. Separate enable/interrupt signals are also communicated from the PCI-ISA bridge 130 to the hard drive 140. Preferably, the PCI-ISA bridge 130 is a single integrated circuit, but other combinations are possible.

A series of ISA slots 134 are connected to the ISA bus I to receive ISA adapter cards, while a series of PCI slots 142 are similarly provided on the PCI bus P to receive PCI adapter cards.

A video controller 165 is also connected to the PCI bus P. Video memory 166 is used to store graphics data and is connected to the video graphics controller 165 and a digital/analog converter (RAMDAC) 168. The video graphics controller 165 controls the operation of the video memory 166, allowing data to be written and retrieved as required. A monitor connector 169 is connected to the RAMDAC 168 for connecting a monitor 170.

Figure 2:
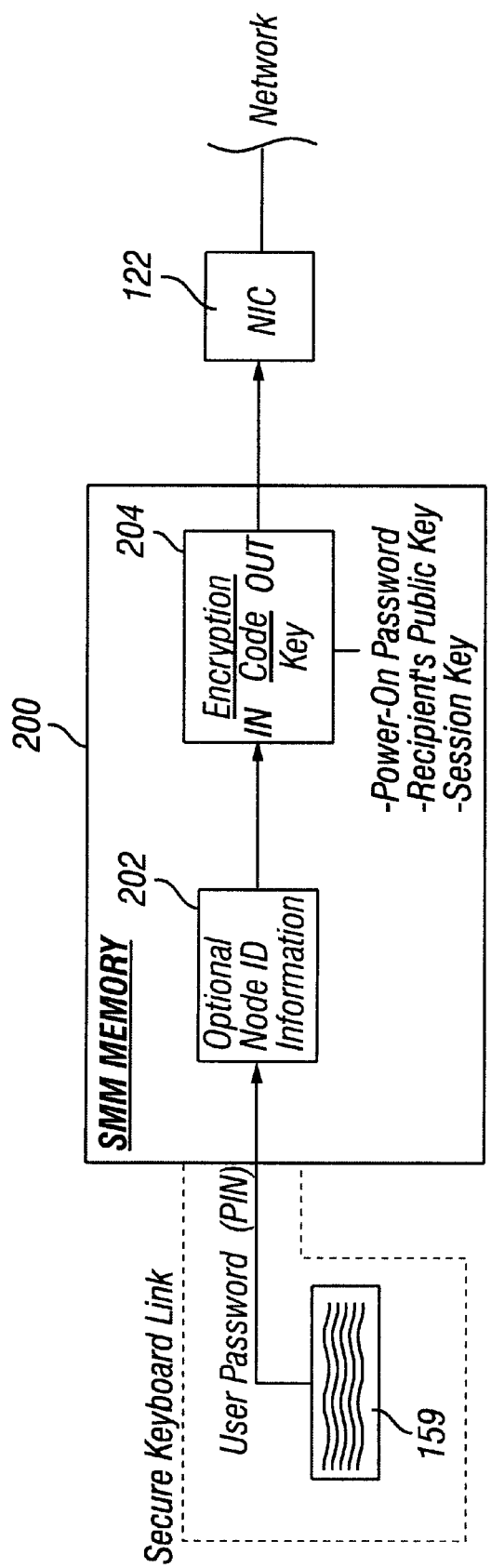
FIGS. 2 and 3 are schematic block diagrams of exemplary encryption procedures according to the present invention.

A network interface controller (NIC) 122 is also connected to the PCI bus P, allowing the computer system S to function as a "node" on a network. Preferably, the controller 122 is a single integrated circuit that includes the capabilities necessary to act as a PCI bus master and slave, as well as circuitry required to act as an Ethernet interface. Attachment Unit Interface (AUI) and 10 base-T connectors 124 are provided in the system S, and are connected to the NIC 122 via filter and transformer circuitry 126. This circuitry forms a network or Ethernet connection for connecting the computer system S to a distributed computer environment or local area network (LAN) as shown in FIG. 2.

A combination I/O chip 136 is connected to the ISA bus I. The combination I/O chip 136 preferably includes a real time clock, two UARTS, a floppy disk controller for controlling a floppy disk drive 138, and various address decode logic and security logic to control access to an internal or external CMOS/NVRAM memory (not shown) and stored password values. Further details of contemplated uses of the NVRAM memory are provided below. Additionally, a control line is provided to the read and write protection logic 164 to further control access to the flash ROM 154. Ser. port connectors 146 and parallel port connector 132 are also connected to the combination I/O chip 136.

An 8042, or keyboard controller, is also included in the combination I/O chip 136. The keyboard controller is of conventional design and is connected in turn to a keyboard connector 158 and a mouse or pointing device connector 160. A keyboard 159 is connected to the computer system S through the keyboard connector 158.

A buffer 144 is connected to the ISA bus I to provide an additional X-bus X for various additional components of the computer system S. A flash ROM 154 receives its control, address and data signals from the X-bus X. Preferably, the flash ROM 154 contains the BIOS information for the computer system and can be reprogrammed to allow for revisions of the BIOS.

In the disclosed embodiment, the computer system S contains circuitry for communicating with a removable cryptographic token 188. The precise physical nature of the token 188 is not considered critical to the invention. The token can take many forms, such as a Touch Memory™ device supplied by Dallas Semiconductor, Inc., a smart card, or an encryption card. Preferably, the token 188 is easily decoupled from the computer system S and easily transportable by the token bearer. Ideally, the token 188 is capable of communicating digitally with the computer system S during momentary contact with or proximity to the computer system S. The token 188 contains at least one of a variety of encryption algorithms (such as DES, Blowfish, elliptic curve-based algorithms, etc.). The token 188 of the disclosed embodiment is capable of storing the encryption algorithm in a non-volatile manner and can be permanently write-protected to discourage tampering.

In the disclosed embodiment of the invention, the circuitry used for establishing a communication link between the token 188 and the computer system S consists of a probe 186 connected to a COM or serial port adapter 184. The port adapter 184 is connected to the RS232 connector 146. Alternatively, the port adaptor 184 could interface with an application specific integrated circuit (ASIC). In operation, the token 188 is detachably received by the probe 186. The probe 186 includes circuitry for reading and writing memory in the token 188, and can be fully powered through the RS232 connector 146. In addition, the probe 186 includes presence detector circuitry for ascertaining the presence of a token 188.

An additional feature of the computer system S is a System Management Mode (SMM), as discussed at length below in conjunction with FIG. 4. It is also noted that FIG. 1 presents an exemplary embodiment of the computer system S and it is understood that numerous other effective embodiments could readily be developed as known to those skilled in the art.

Referring now to FIG. 2, an encryption procedure according to the present invention is illustrated. In the disclosed embodiment, user password or personal identification number (PIN) information is entered via a secure communication link between a keyboard 159 and SMM memory 200 (FIG. 4). Details of the secure communication link are provided in conjunction with FIG. 5. The user password can also be entered during other secure modes of operation such as a protected power-up procedure. Computer network resources utilize the user password or PIN information for user verification, as a session key, or for any of a multitude of other purposes.

Following entry of a user password or PIN, optional node identification information 202 is appended. The node identification information 202 can also serve many purposes. For example, the node identification information can be used to allow a network server to identify a particular network node and grant access privileges accordingly (similar to the functionality provided by the aforementioned control vector). This makes it possible to restrict access privileges to a specific user at a specific network node or provide multiple levels of user access. Such use of the network node information allows certain documents or data to be accessible to a limited number of computers, such as those physically located at the facility.

Alternatively, the node identification information could take the form of a session key to be used during subsequent secure encrypted communications. In any form, the optional node identification information 202 is preferably stored in a secure memory space such as SMM memory 200 that is not accessible to normal software processes, thereby preventing unauthorized copying or modification.

When communications requiring secure encryption processes are detected, the user password and any appended node identification information are passed to encryption code 204. Any of the aforementioned encryption algorithms can be utilized, although algorithms that require relatively small amounts of memory (such as elliptic curve encryption algorithms) are preferred. Depending on the nature of the secured communications, an encryption process according to the embodiment of the invention shown in FIG. 2 is capable of utilizing a number of different, securely stored encryption keys. Examples include an administrative or power-on password, a recipient's public key, or a predetermined session key.

Following the encryption process, the encrypted password and node identification information is communicated directly from secure memory to network interface control circuitry 122 for communication over a network. It is contemplated that protected information can be transferred by software applications that are capable of utilizing SMM memory 200 to perform the encryption process and communicate the results directly to the network interface control circuitry 122.

Figure 3:
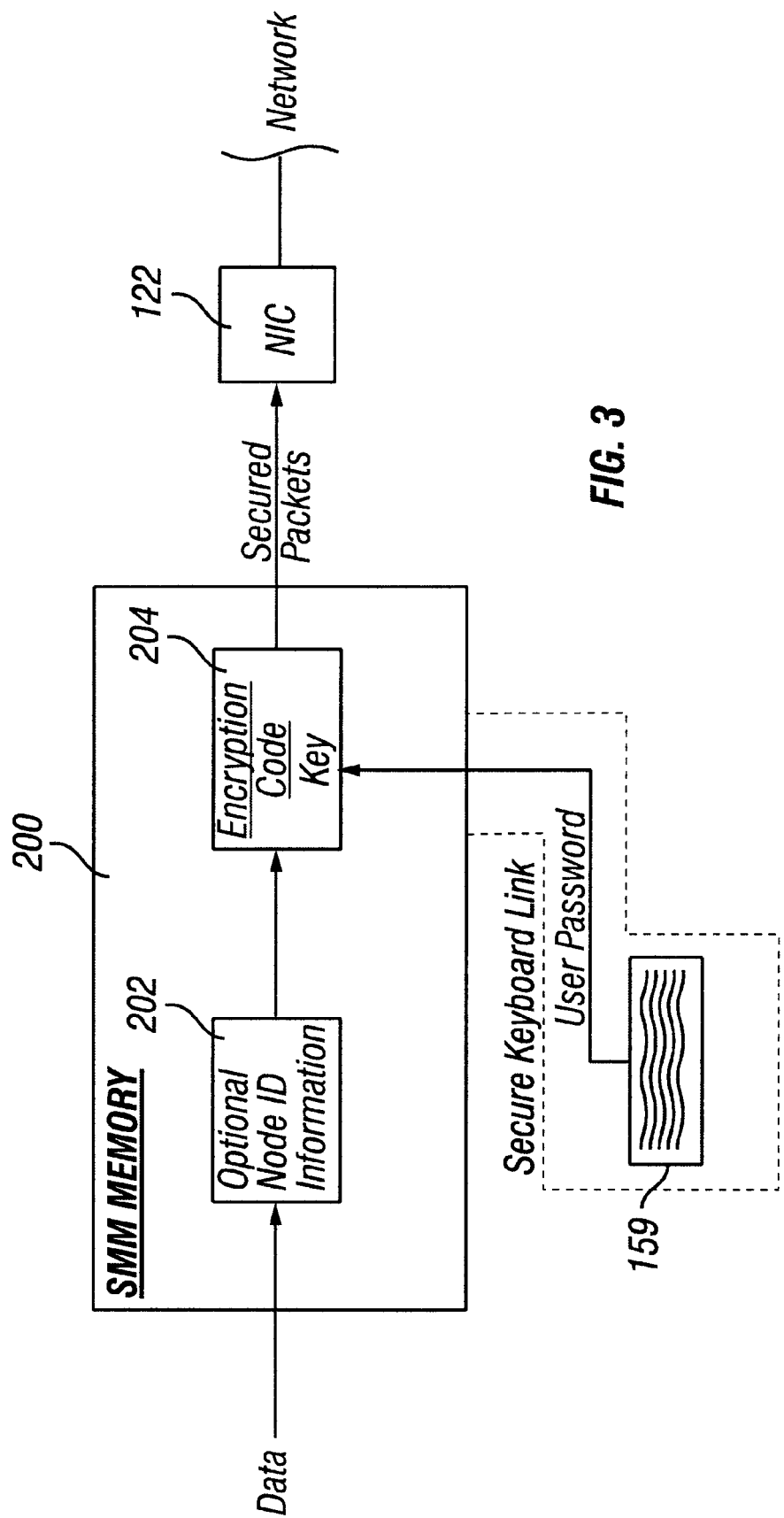

Referring now to FIG. 3, an alternate encryption procedure according to the present invention is illustrated. In this embodiment of the invention, data that is sent over a computer network is first appended with optional node identification information 202 that is stored in SMM memory 200. The data is then provided to an encryption algorithm 204. A user password which has been entered in a secure manner is utilized as an encryption key (or to generate an encryption key) for the encryption algorithm 204. While in SMM memory 200, the encryption key governs the encryption of packets of data prior to communicating the data over a computer network.

The encryption key data entered by the user can be securely stored for use in multiple encryption processes during a communication session, thereby alleviating the overhead of repeated key renegotiation that is typically required. Further, by maintaining passwords, encryption keys and encryption algorithms in secure memory, the encryption processes shown in FIGS. 2 and 3 can be protected from exposure to malicious software programs or viruses written to circumvent security measures. In addition, an encryption key that is no longer needed can be safely destroyed in secure memory without the danger of unaccounted for copies of the key remaining in computer memory.

The System Management Mode

Figure 4:
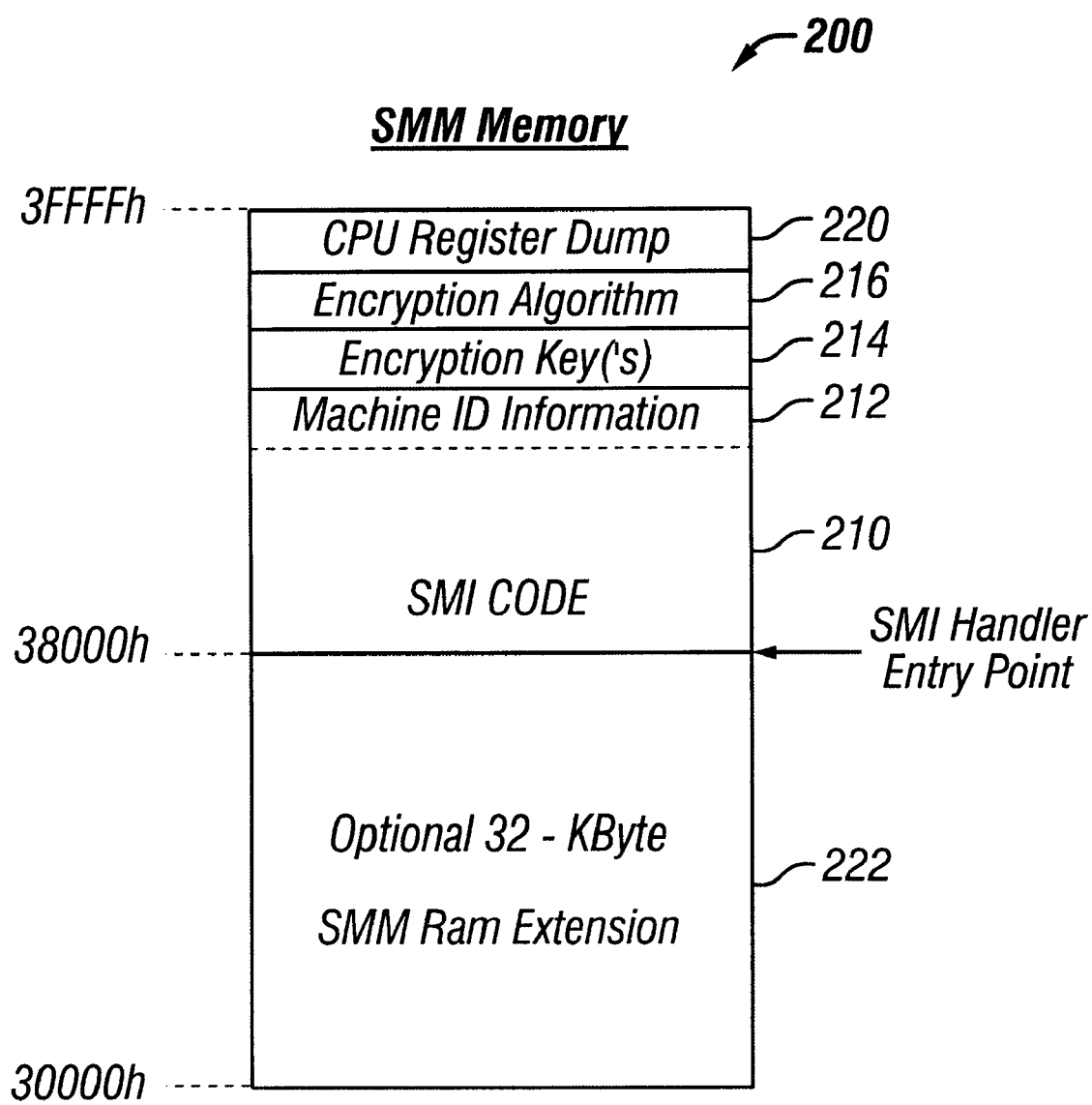
FIG. 4 is graphical representation of System Management Mode memory contents according to the present invention.

Referring now to FIG. 4, certain microprocessors, such as the Pentium® processor from Intel Corporation, include a mode referred to as system management mode (SMM), which is entered upon receipt of a system management interrupt (SMW). Originally, SMIs were power management interrupts devised by Intel Corporation for portable systems. Portable computers often draw power from batteries which provide a limited amount of energy. To maximize battery life, an SMI is typically asserted to turn off or reduce the power to any system component that is not currently in use. Although originally meant for laptop computers, SM's have become popular for desktop and other stationary models as well.

SMIs are asserted by either an SMI timer, by a system request, or by other means. An SMI is a non-maskable interrupt having almost the highest priority in the system. Only the reset signal R/S* and cache flush signal FLUSH*, which can be conceptualized as interrupts, have a higher priority than the SMI. When an SMI is asserted, a microprocessor maps a portion of memory referred to as the system management mode memory ("SMM memory") into the main memory space. The entire CPU state is then saved in the SMM memory (in the CPU register dump 220 of FIG. 4) in stack-like, last in/first out fashion. After the initial processor state is saved, the processor 102 begins executing an SMI handler routine 210, which is an interrupt service routine to perform specific system management tasks such as reducing power to specific devices or, as in the case of the present invention, providing security services. While the routine is executed, other interrupt requests are not serviced, and are ignored until the interrupt routine is completed or the microprocessor is reset. When the SMI handler 210 completes its task, the processor state is retrieved from the SMM memory 200, and the main program continues. An SMI active signal referred to as the SMIACT* signal is provided by the processor to indicate operation in SMM.

As mentioned, following assertion of its SMI input (this is generally an active low signal), the processor 102 calls the SMI handler 210, which addresses an address space that is separate from ordinary main memory. Thereafter, all memory accesses refer only to SMM memory 200. Input/output ("I/O") accesses via instructions such as IN or OUT are still directed to the normal I/O address space, however. One advantageous side-effect of the hardwired separate address SMM area is that the routines stored in this space cannot be snooped by the cache, providing an additional layer of protection.

In a typical system management mode implementation, it is intended that battery-backed SRAM chips be mapped into the address space between 30000h and 3fffffh by default. External hardware can use the SMIACT* signal as a chip select signal and thereby address either the SRAM chips (the SMIACT* signal is at a logic low level), or the normal main memory (the SMIACT* signal is at a logic high level). By using the SMIACT* signal, then, SMM memory 200 and normal memory can be strictly separated.

Referring more specifically to FIG. 4, a graphical representation of SMM memory 200 as configured according to the present invention is shown. As mentioned above, this address space is addressed by the processor 102 following an SMI. Following an SMI, the state of the processor 102 is stored in the CPU register dump 220. The SMI handler 210 is then called and executed by the processor 102. Importantly, the SMI handler 210 can be written such that it performs tasks other than power-down operations. An SMI handler 210 written according to the present invention is able to utilize machine identification information 212, encryption keys 214, and an encryption algorithm 216 to securely perform encryption operations. Because SMM memory 200 is only addressable while the computer system is in SM, storing machine identification information 212, encryption keys 214 and the encryption algorithm 216 in SMM memory 200 prevents malicious code from modifying or reading these sensitive components of the disclosed embodiment of the invention. The optional 32-Kbyte SMM RAM extension 222 can be utilized for securely performing encryption functions or to store additional encryption keys.

Figure 5:
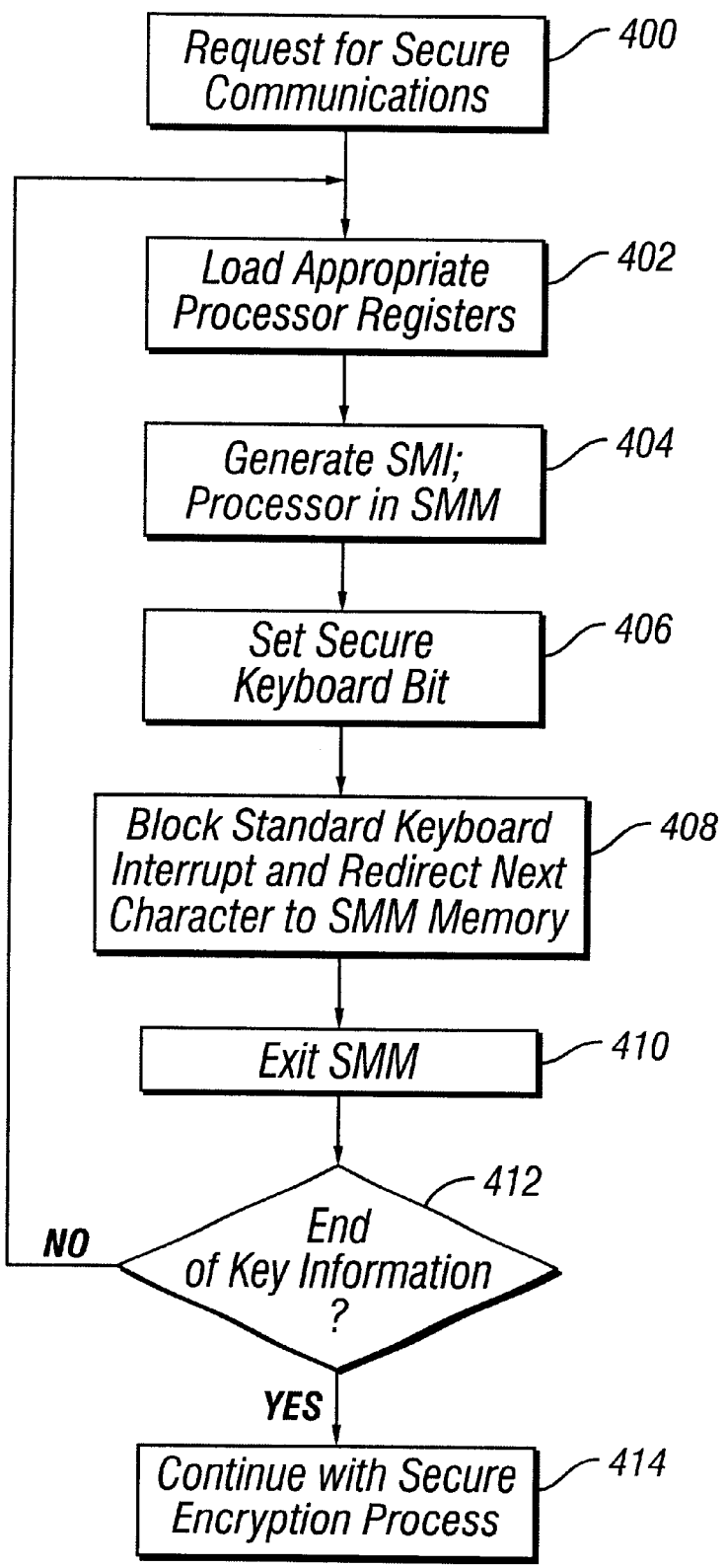
FIG. 5 is a flowchart diagram illustrating a procedure according to the present invention for securely entering encryption key data from a keyboard.

Referring now to FIG. 5, a procedure accordingly to the present invention for securely obtaining a single character of encryption key information is illustrated. The key information is communicated to secure memory by means of a secure keyboard communications channel such as that described in previously incorporated "METHOD AND APPARATUS FOR PROVIDING SECURE AND PRIVATE KEYBOARD COMMUNICATIONS IN COMPUTER SYSTEMS." Briefly, a request for secure keyboard communications causes the computer's processor to enter into SMM. The SMI handler then directs specialized hardware to intercept and divert keyboard interrupts, such that data entered via the keyboard is only communicated to secure, non-readable memory. The secured keyboard communications channel prevents the key information from being intercepted by malicious software code, such as a virus masquerading as a screen saver or device driver.

The procedure of FIG. 5 commences in step 400 when the computer system S detects a request for secure communications or any event requiring secure entry of encryption information. Control then proceeds to step 402 where appropriate registers in processor 102 are loaded prior to execution of the SMI code 210. The register values indicate a request for secured keyboard communications. Control next proceeds to step 404 where an application generates a "soft" SMI that is essentially a software interrupt (analogous to a BIOS software interrupt call procedure). The soft SMI in turn places the processor 102 in SMM.

In addition to the programmatic interface, other methods of generating an SMI are also contemplated. For example, the SMI could be initiated by a specified keystroke sequence or by pressing a specialized key used to place the system in SMM. The precise manner in which the SMI is generated is not critical to the invention. The SMI need only be generated such that the SMI handler 210 recognizes that a secure keyboard link is needed.

Following an SMI in step 404, the processor 102, now in SMM, executes the code in the memory address where the SMI handler 210 resides. The SMI handler 210 first examines the appropriate processor 102 registers to determine what type of process initiated the SMI request. The processor 102 recognizes the type of SMI call that has been initiated (in the present example, a secure keyboard request) by the data stored in the processor 102 registers. Once the request is identified as a request for secure keyboard communications, the SMI handler 210 then executes the routine used to intercept a keyboard interrupt. The keyboard interrupt is assumed to be IRQ1 for purposes of this specification.

Control next proceeds to step 406 where the SMI handler 210 sets a secure keyboard bit that functions to activate circuitry for intercepting IRQ1. The secure keyboard bit can only be set while the processor 102 is in SMM, and is therefore secure. Control then proceeds to step 408, where the special hardware blocks the standard keyboard interrupt IRQ1 normally associated with a keystroke. The character code associated with the blocked interrupt is then directed to secure memory such as SMM memory 200, protected/locked NVRAM or Flash ROM 154, or in some other secure memory such as that disclosed in the previously incorporated "SECURITY CONTROL FOR A PERSONAL COMPUTER." Since the keyboard interrupt IRQ1 is blocked, any malicious code that awaits this interrupt is never activated. In fact, in the disclosed embodiment, secured keystrokes are not visible to any other processes.

Control next proceeds to step 410 where SMM is exited, and the secure keyboard bit is unset. Control then proceeds to step 412 where the program or process requesting the secure keyboard channel determines if the entry of the encryption key information is complete. If not, control returns to step 402 for retrieval of the next keyboard character. If the key information is complete as determined in step 414, control passes to step 412 for continuation of the secure encryption process. Note that entry of encryption key information is not considered to be limited to the disclosed secure keyboard channel. Likewise, the precise ordering of the steps of FIG. 5 is not considered critical to the invention.

In one alternate embodiment of the invention, encryption key information is entered during a secure power-up procedure. This embodiment of the invention builds upon a secure power-up procedure such as that described in the previously incorporated SAFESTART patent. Briefly, the SAFESTART invention reduces the administrative requirements of earlier secure power-on techniques. A reserved non-DOS hard disk partition is used to pre-boot the computer system S and provide a secure environment from which to verify files. Upon power-up or reset, the computer performs the power-on self test (POST), during which it checks a SAFESTART track by comparing its hash value to a value stored in NVRAM. If the integrity of the SAFESTART track is verified, the first "SAFESTART" routine is loaded into memory and executed.

The SAFESTART routine first checks the master boot record and boot sectors of the hard disk This verification captures a large majority of viruses and is performed before any code residing in those areas is executed, thus preventing the spread of any discovered viruses. Further checks are performed on SAFESTART files before each is executed. Eventually, all system files and any additional designated user files are verified.

At some point during the SAFESTART routine, a user is prompted to enter encryption key information. This information is stored in secure computer memory that is accessible while the computer system S is in system management mode. When the key information entry process is completed and the secure power-up procedure is complete, SAFESTART files are cleaned up, a latch is set to prevent unauthorized modification of the initial hash values, and control is returned to the BIOS to boot the user operating system. Thus, use of a computer system implemented according to the SAFESTART patent and the present invention insures that user-entered encryption key information is trustworthy following a power-up cycle.

Thus, a secure environment for the creation, storage and use of encryption keys in a distributed computing environment has been described. In a computer system according to the invention, session keys, passwords, and encryption algorithms are maintained in a secure memory space such as System Management Mode (SMM memory. Following secure entry of user password or encryption key information, an encryption process is performed in the protected memory space. The encryption keys used for the encryption process cannot be appropriated during normal computer operation. Problems associated with key renegotiation and destruction are thereby alleviated.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for securely managing encryption information in a computer system, having a secure mode of operation and a normal mode of operation, the method comprising the steps of:

operating in the normal mode of operation comprising the steps of:

storing normal software processes in a normal memory space accessible by a general processor of the computer system;

performing normal computer operation in the normal memory space; and operating in the secure mode of operation comprising the steps of:

storing an encryption algorithm in a secure memory space not accessible to the normal software processes and only accessible by the general processor in the secure mode of operation;

receiving encryption information in the secure memory space through a secure channel;

storing encryption information in the secure memory space; and performing an encryption process only in the secure memory space with the encryption information.

2. The method of claim 1, wherein said step of receiving encryption information through a secure channel further comprises communicating the encryption information to the secure memory space via a secure keyboard communications channel.

3. The method of claim 1, wherein said step of receiving encryption information through secure channels further comprises:

generating an interrupt in response to a request to enter encryption information;

placing the processor in the secure mode of operation as a result of said step of generating an interrupt; and entering encryption information via the keyboard, whereby a keyboard interrupt is generated;

intercepting the keyboard interrupt and generating a signal indicating the presence of encryption information, provided the computer system is in the secure mode of operation; and diverting the encryption information to the secure memory space through a secure communication link between the keyboard and the secure memory space in response to the signal.

4. The method of claim 1, wherein said step of operating in the secure mode of operation executes during a secure power-up procedure.

5. The method of claim 1, wherein said step of operating in the secure mode of operation comprises the steps of operating during a system management mode of the computer system.

6. The method of claim 1, wherein said step of storing encryption information comprises storing encryption keys in the secure memory space.

7. The method of claim 1, wherein said step of storing encryption information comprises storing passwords in the secure memory space.

8. The method of claim 1, wherein said step of operating in the secure mode of operation further comprises the steps of:

storing node identification information in the secure memory space; and appending the node identification information to the encryption information prior to use of the encryption information in the encryption process.

9. The method of claim 1, wherein said step of performing an encryption process comprises the steps of encrypting the encryption information using the encryption algorithm and a recipient's public key as an encryption key.

10. The method of claim 7, wherein said step of performing the encryption process comprises the steps of encrypting the encryption information using an encryption algorithm and a password as an encryption key.

11. The method of claim 1, wherein said step of performing the encryption process comprises the steps of encrypting the encryption information using an encryption algorithm and a session key maintained in the secure memory space.

12. The method of claim 1, wherein said step of performing the encryption process comprises the step of utilizing the encryption information as an encryption key to encrypt data.

13. A computer system providing capabilities for securely performing encryption operations, comprising:

a system bus;

a general processor coupled to said system bus, said general processor incorporating secure mode capabilities;

a normal mode memory coupled to said system bus and accessible by said general processor when the computer system is in a normal mode of operation, said normal memory containing normal software processes for performing normal computer operations; and a secure mode memory coupled to said system bus and accessible by said general processor only when the computer system is in a secure mode of operation, said secure mode memory containing encryption key information for performing encryption operations.

14. The computer system of claim 13, wherein said secure mode memory further contains an encryption algorithm capable of being executed during the secure mode of operation.

15. The computer system of claim 13, further comprising:

power-on code stored in a processor readable medium coupled to said system bus for causing the general processor, on power-on, to perform the steps of:
receiving encryption information; and providing the encryption information to said secure mode memory.

16. The computer system of claim 15, wherein said power-on code is executed during a secure power-on procedure.

* * * * *